(12) United States Patent
Tsuno

(10) Patent No.: US 12,510,904 B2
(45) Date of Patent: Dec. 30, 2025

(54) DRIVING ASSISTANCE METHOD, PROCESSING APPARATUS, AND MOBILE MACHINE

(71) Applicant: HONDA MOTOR CO., LTD., Tokyo (JP)

(72) Inventor: Koichi Tsuno, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 124 days.

(21) Appl. No.: 18/396,368

(22) Filed: Dec. 26, 2023

(65) Prior Publication Data

US 2024/0219912 A1  Jul. 4, 2024

(30) Foreign Application Priority Data

Dec. 28, 2022  (JP) .................................. 2022-212113

(51) Int. Cl.
*G05D 1/227* (2024.01)
*G05D 1/24* (2024.01)
*G05D 105/70* (2024.01)

(52) U.S. Cl.
CPC ............... *G05D 1/227* (2024.01); *G05D 1/24* (2024.01); *G05D 2105/70* (2024.01)

(58) Field of Classification Search
CPC ........ G05D 1/227; G05D 1/24; G05D 1/2246; G05D 2105/70; G05D 2107/13; G05D 2109/10
See application file for complete search history.

(56) References Cited

U.S. PATENT DOCUMENTS

| | | | |
|---|---|---|---|
| 2018/0088572 A1 | 3/2018 | Uchida et al. | |
| 2019/0146495 A1 | 5/2019 | Yan | |
| 2019/0248379 A1 | 8/2019 | Peterson et al. | |
| 2020/0004241 A1* | 1/2020 | Levinson | G05D 1/0044 |
| 2025/0065919 A1* | 2/2025 | Yu | G07C 5/008 |

FOREIGN PATENT DOCUMENTS

| | | | |
|---|---|---|---|
| JP | 2016-137819 A | 8/2016 | |
| JP | 2019-127120 A | 8/2019 | |
| JP | 2021-006818 A | 1/2021 | |
| JP | 2021-040653 A | 3/2021 | |
| WO | WO-2023068131 A1 * | 4/2023 | ............... G08G 1/09 |

OTHER PUBLICATIONS

May 7, 2024, Translation of Japanese Office Action issued for related JP Application No. 2022-212113.

* cited by examiner

*Primary Examiner* — Michael J Zanelli
(74) *Attorney, Agent, or Firm* — Paratus Law Group, PLLC

(57) ABSTRACT

A driving assistance method for assisting driving of a mobile machine, the driving assistance method includes: executing processes of, by one or more processors, acquiring at least one of a first position on an autonomous driving route and a first angle indicating a direction in which the mobile machine travels at the first position when the mobile machine deviates from the autonomous driving route by switching from autonomous driving to manual driving, and outputting driving assistance information for assisting the manual driving according to at least one of a difference between the first position and a second position that is a position of the mobile machine traveling by the manual driving, and a difference between the first angle and a second angle indicating a direction in which the mobile machine is traveling at the second position.

13 Claims, 9 Drawing Sheets

DRIVING ASSISTANCE METHOD, PROCESSING APPARATUS, AND MOBILE MACHINE

CROSS-REFERENCE TO RELATED APPLICATIONS

This application is based on and claims priority under 35 USC 119 from Japanese Patent Application No. 2022-212113 filed on Dec. 28, 2022, the entire content of which is incorporated herein by reference.

TECHNICAL FIELD

The present invention relates to a driving assistance method, a processing apparatus, and a mobile machine.

BACKGROUND ART

In a case where there is, for example, an obstacle on a travel route of a mobile machine which is autonomously driving in a state where there is no occupant, a driving mode is switched to remote manual driving, and the mobile machine temporarily deviates from the travel route of the autonomous driving, so that the mobile machine can avoid the obstacle.

In this regard, JP2021-40653A discloses a work traveling management system. The work traveling management system manages work traveling at a work field of a work vehicle that can automatically travel along a travel route.

The work traveling management system includes: an interruption information recording unit that records an interruption of work traveling of the work vehicle as interruption information; an interruption information extraction unit that extracts the interruption information from the interruption information recording unit; an information display unit that displays the extracted interruption information before determining the interrupted work traveling; and a restart information generation unit that generates restart information for restarting the interrupted work traveling based on the interruption information and displays the restart information on the information display unit.

If the mobile machine deviating from the travel route is returned to the travel route, the mobile machine can restart the autonomous driving. However, it is not always easy to return the mobile machine to the travel route, especially by remote manual driving.

The present invention provides a driving assistance method, a processing apparatus, and a mobile machine that can assist driving of a mobile machine capable of autonomous driving and manual driving.

According to the present invention, it is possible to assist driving of a mobile machine capable of autonomous driving and manual driving.

DESCRIPTION OF EMBODIMENTS

Hereinafter, the present embodiment will be described with reference to the accompanying drawings.

Figure 1:
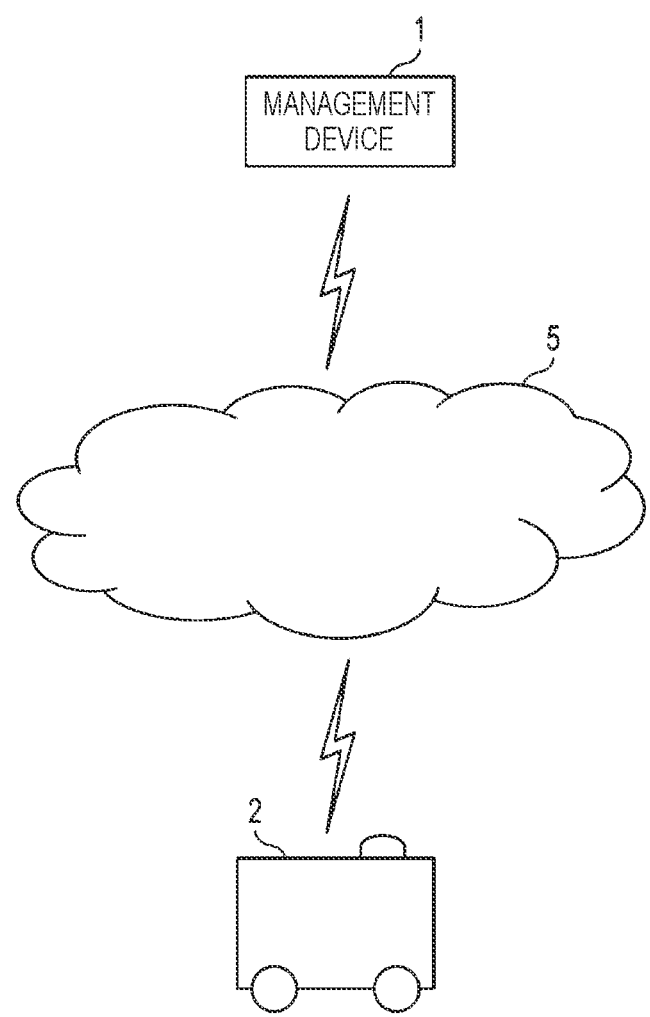
FIG. 1 shows an overview of a system according to the present embodiment.

FIG. 1 shows an overview of a system according to the present embodiment. The system of the present embodiment includes a management device 1 and an autonomous mobile machine 2. The management device 1 and the autonomous mobile machine 2 can communicate with each other via a network 5 such as the Internet. In the example of FIG. 1, the number of autonomous mobile machine is 1, but may be two or more. The autonomous mobile machine 2 can travel by autonomous driving, and can also travel by manual driving. The autonomous mobile machine 2 moves in order to carry a package, materials, equipment, and the like at a work place such as a construction site, a farm and a harbor.

The autonomous mobile machine 2 includes a positioning antenna. In the present embodiment, the autonomous mobile machine 2 has an antenna of a real time kinematic global navigation satellite system (RTK-GNSS), and the management device 1 can know a position of the autonomous mobile machine 2 using the RTK-GNSS. A fixed base station of the RTK-GNSS installed on the ground surface is provided at a work place where the autonomous mobile machine 2 operates. However, the positioning method may be other than the RTK-GNSS.

The management device 1 is a device that manages the operation of the autonomous mobile machine 2. The management device 1 sets an operation mode for the autonomous mobile machine 2 and controls the autonomous mobile machine 2 to operate in accordance with the operation mode. In the present embodiment, the operation mode includes an autonomous driving mode and a manual driving mode. In the autonomous driving mode, the autonomous mobile machine 2 performs autonomous driving according to a program installed in advance. In the manual driving mode, in accordance with an operation of a user (that is, manual driving), the management device 1 transmits, to the autonomous mobile machine 2, a movement instruction including information such as a movement destination, a route to the movement destination, and a movement speed, and moves the autonomous mobile machine 2.

Figure 2:
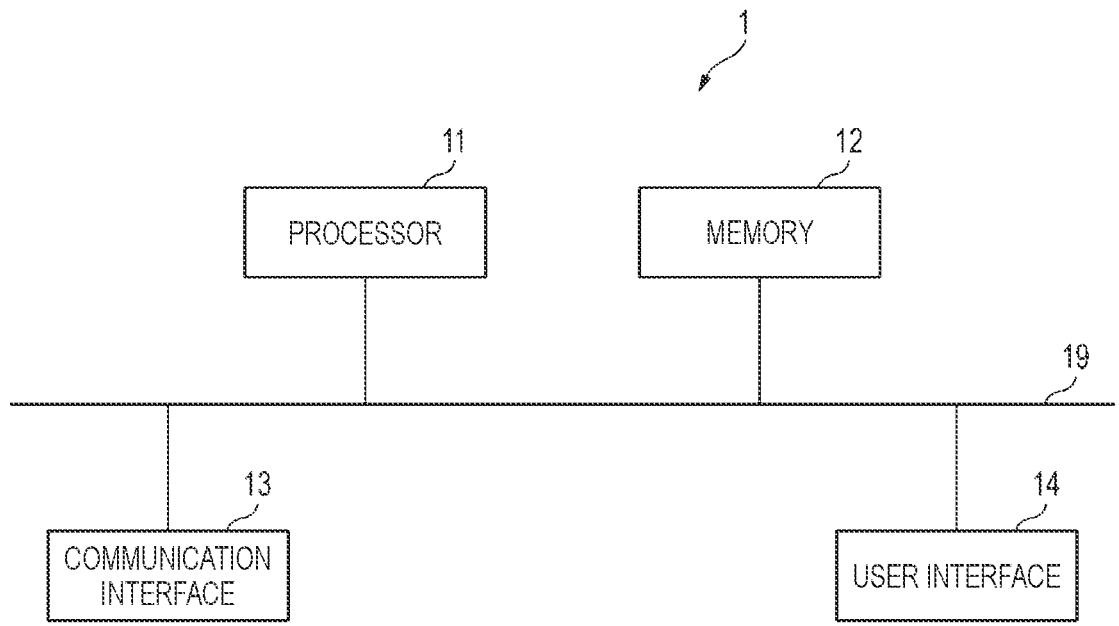
FIG. 2 shows an example of a hardware configuration of a management device.

FIG. 2 shows an example of a hardware configuration of the management device 1. The management device 1 includes a processor 11, a memory 12, a communication interface 13, and a user interface 14. The processor 11, the memory 12, the communication interface 13, and the user interface 14 are connected by, for example, a bus 19.

The processor 11 is a circuit that performs signal processing, and is, for example, a central processing unit (CPU) that controls the entire management device 1. The processor 11 may be implemented by another digital circuit such as a field programmable gate array (FPGA) or a digital signal processor (DSP). In addition, the processor 11 may be realized by combining a plurality of digital circuits.

The memory 12 includes, for example, a main memory and an auxiliary memory. The main memory is, for example, a random access memory (RAM). The main memory is used as a work area of the processor 11.

The auxiliary memory is a non-transitory computer-readable storage medium, and is, for example, a non-volatile memory such as a magnetic disk, an optical disk, or a flash memory. Various programs for operating the management device 1 are stored in the auxiliary memory. The programs stored in the auxiliary memory are loaded onto the main memory and executed by the processor 11.

The auxiliary memory may include a portable memory removable from the management device 1. The portable memory is, for example, a memory card such as a universal serial bus (USB) flash drive or a secure digital (SD) memory card, or an external hard disk drive.

The communication interface 13 is a communication interface that performs communication with an outside (for example, autonomous mobile machine 2) of the management device 1. The communication interface 13 is controlled by the processor 11.

The user interface 14 includes, for example, an input device that receives an operation input from a user (for example, a person who operates the management device 1), an output device that outputs information, and the like. The input device is implemented by, for example, a pointing device (for example, a mouse), a key (for example, a keyboard), a remote controller, or the like. The output device is implemented by, for example, a display or a speaker. Further, both the input device and the output device may be implemented by a touch panel or the like. The user interface 14 is controlled by the processor 11.

Figure 3:
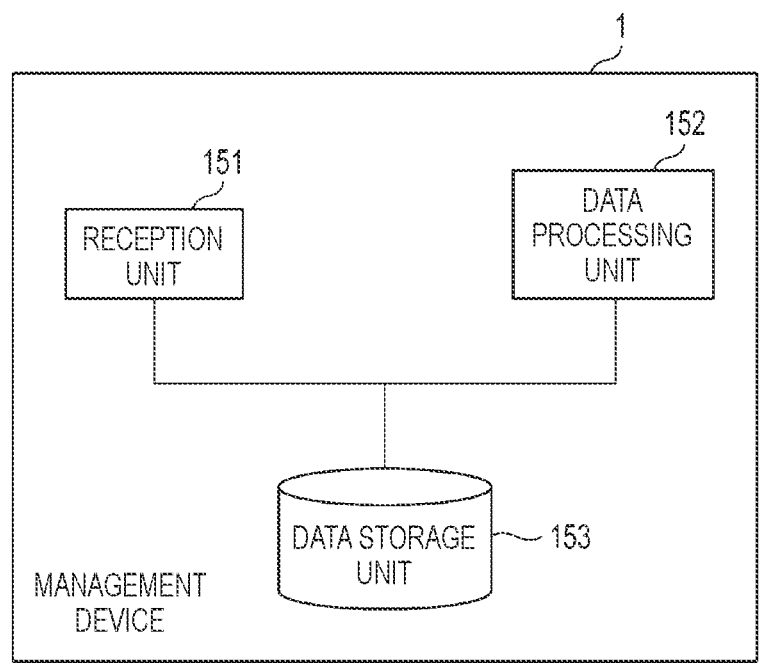
FIG. 3 shows an example of a functional block diagram of the management device.

FIG. 3 shows an example of a functional block diagram of the management device 1. In the management device 1, the functions of a reception unit 151 and a data processing unit 152 shown in FIG. 3 are realized by causing the processor 11 to execute a program (software). A data storage unit 153 is implemented in the memory 12.

The reception unit 151 receives data from the autonomous mobile machine 2 and stores the data in the data storage unit 153.

The data processing unit 152 executes processing such as generating data to be displayed on the output device (for example, a display) of the management device 1 based on the data stored in the data storage unit 153.

The data storage unit 153 stores the data on a position received from the autonomous mobile machine 2, a notification of a deviation from an autonomous travel route, a notification of a deviation from a position and a traveling direction at the time of return, and the like.

Figure 4:
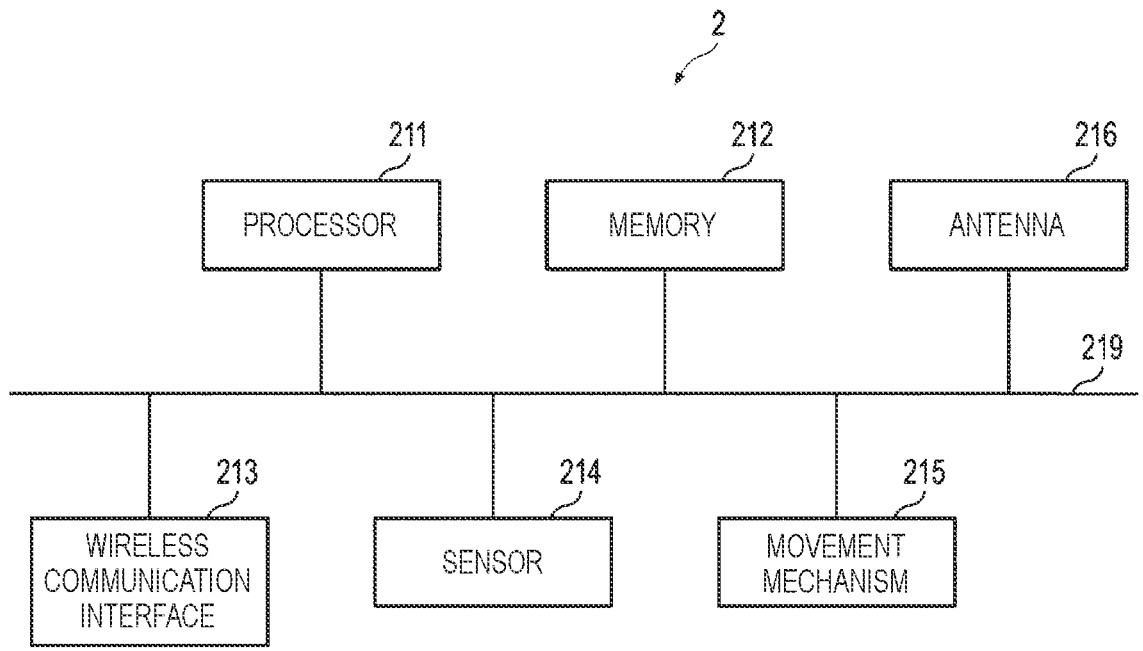
FIG. 4 shows an example of a hardware configuration of an autonomous mobile machine.

FIG. 4 shows an example of a hardware configuration of the autonomous mobile machine 2. The autonomous mobile machine 2 includes a processor 211, a memory 212, a wireless communication interface 213, a sensor 214, a movement mechanism 215, and an antenna 216. The processor 211, the memory 212, the wireless communication interface 213, the sensor 214, the movement mechanism 215, and the antenna 216 are connected by, for example, a bus 219.

The processor 211 and the memory 212 of the autonomous mobile machine 2 have the same configuration as the processor 11 and the memory 12 of the management device 1, respectively.

The wireless communication interface 213 is a communication interface that performs wireless communication with the outside (for example, the management device 1) of the autonomous mobile machine 2. The wireless communication interface 213 is controlled by the processor 211.

The sensor 214 includes various sensor capable of acquiring information on a moving state of the autonomous mobile machine 2, external information, and the like. The sensor 214 is controlled by the processor 11, and sensing data of the sensor 214 is acquired by the processor 11.

The sensor 214 includes, for example, a camera, a light detection and ranging (LiDAR) sensor, a wheel encoder, and an inertial measurement unit (IMU).

The camera is a sensor for acquiring image data. The LiDAR sensor is a three-dimensional sensor for three-dimensionally recognizing the outside of the autonomous mobile machine 2. Specifically, the LiDAR sensor emits a laser beam to measure time until the emitted laser beam hits an object and bounces back and measure a distance and direction to the object.

The LiDAR sensor is provided, for example, so as to be able to sense the front of the autonomous mobile machine 2. A plurality of LiDAR sensors may be provided so as to be able to sense a plurality of directions. The LiDAR sensor may be able to perform swinging (panning and tilting), zooming, or the like. The wheel encoder is a sensor that measures a rotation speed of a wheel (wheel speed), and can acquire a vehicle speed of the autonomous mobile machine 2 from a measurement result by the wheel encoder. The IMU is a sensor that measures accelerations in a front-rear direction, a left-right direction, and an upper-lower direction of the autonomous mobile machines 2, and angular velocities in a pitch direction, a roll direction, and a yaw direction.

The movement mechanism 215 is a mechanism for the autonomous mobile machine 2 to autonomously move. The movement mechanism 215 is, for example, a wheel or a leg for walking. The movement mechanism 215 is controlled by the processor 211. In the following example, it is assumed that the movement mechanism 215 is a wheel. Although not shown, the autonomous mobile machine 2 includes an actuator such as a motor unit, and moves by driving the movement mechanism 215 by the actuator.

The antenna 216 is an antenna for positioning the RTK-GNSS. A communication module (not shown) receives a signal transmitted from an artificial satellite via the antenna 216, and the position information can be calculated by the communication module. The calculated position information is processed by the processor 211, or is transmitted to the management device 1 via the wireless communication interface 213.

Figure 5:
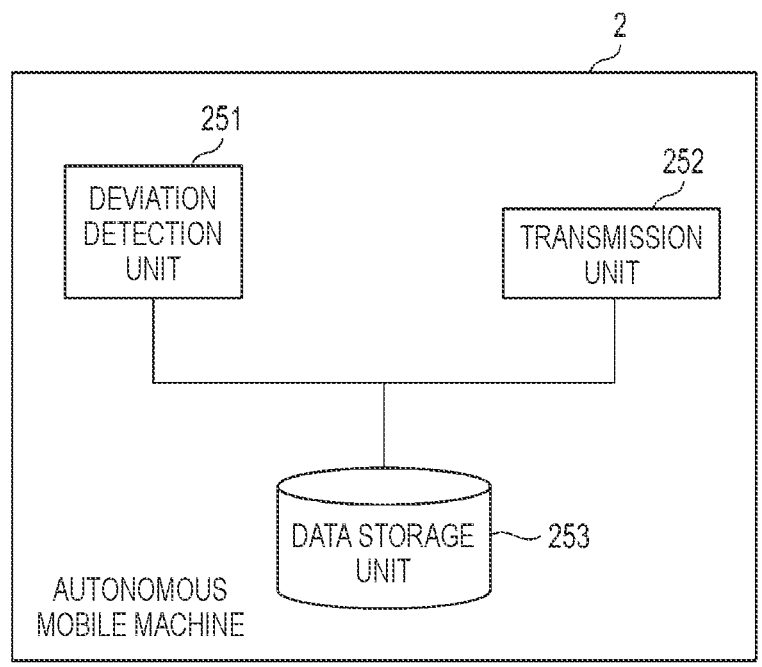
FIG. 5 shows an example of a functional block diagram of the autonomous mobile machine.

FIG. 5 shows an example of a functional block diagram of the autonomous mobile machine 2. In the autonomous mobile machine 2, the functions of a deviation detection unit 251 and a transmission unit 252 shown in FIG. 5 are implemented by causing the processor 211 to execute a program (software). A data storage unit 253 is implemented in the memory 212.

The deviation detection unit 251 executes processing of determining whether a deviation from the autonomous travel route has occurred, and processing of determining whether there is a deviation from the position and the traveling direction at the time of return.

The transmission unit 252 transmits the data on the position of the autonomous mobile machine 2, the notification of the deviation from the autonomous travel route, the notification of the deviation from the position and the traveling direction at the time of return, and the like to the management device 1.

The data storage unit 253 stores the information on the autonomous travel route, the position information on the autonomous mobile machine 2 in a past predetermined period, and the like. The information on the autonomous travel route includes position information and information on the traveling direction at each point on the autonomous travel route.

Figure 6:
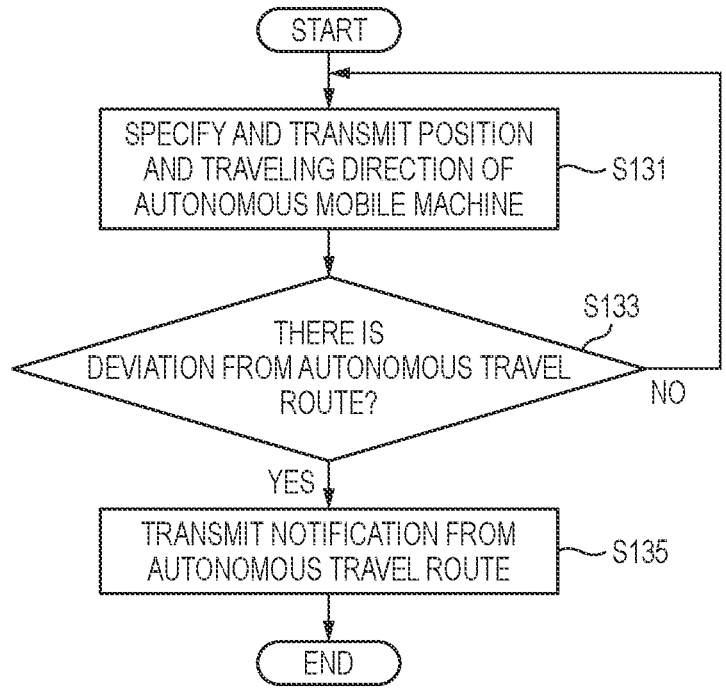
FIG. 6 shows a flow of processing executed by the autonomous mobile machine.

FIG. 6 shows a flow of processing executed by the autonomous mobile machine 2. The processing is executed, for example, at regular time intervals while the autonomous mobile machine 2 is moving. However, after the deviation from the position and the traveling direction at the time of return is detected by the processing described with reference to FIG. 7, the processing of step S131 and S133 may be skipped.

After the autonomous driving in the autonomous driving mode is switched to the manual driving in the manual driving mode, the transmission unit 252 of the autonomous mobile machine 2 specifies a current position of the autonomous mobile machine 2 and a traveling direction of the autonomous mobile machine 2 at the current position. The transmission unit 252 transmits the information on the specified current position and the information on the traveling direction to the management device 1 (step S131), and stores the information in the data storage unit 253. The reception unit 151 of the management device 1 receives the information on the current position and the information on the traveling direction of the autonomous mobile machine 2 from the autonomous mobile machine 2 and stores the information in the data storage unit 153.

The deviation detection unit 251 of the autonomous mobile machine 2 determines whether a deviation from the autonomous travel route has occurred based on the data stored in the data storage unit 253 (step S133). In step S133, it is determined whether a condition that a differential between a specific position on the autonomous travel route and the current position of the autonomous mobile machine 2 is equal to or greater than a predetermined value (for example, 3 meters) and a condition that a differential between the traveling direction of the autonomous mobile machine 2 at the specific position on the autonomous travel route and the traveling direction of the autonomous mobile machine 2 at the current position is equal to or greater than a predetermined value (for example, 5 degrees) are satisfied. The specific position on the autonomous travel route is, for example, a position on the autonomous travel route and closest to the current position of the autonomous mobile machine 2. In the present embodiment, if any one of the conditions is satisfied, it is determined that a deviation from the autonomous travel route has occurred. By using such a condition, it is possible to prevent a signal from being generated only by slightly deviating from the autonomous travel route.

If the deviation from the autonomous travel route does not occur (step S133: No route), the processing returns to step S131. If the deviation from the autonomous travel route occurs (step S133. Yes route), the deviation detection unit 251 of the autonomous mobile machine 2 generates a notification of a deviation from the autonomous travel route and outputs the notification to the transmission unit 252. The transmission unit 252 transmits the notification of the deviation from the autonomous travel route to the management device 1 (step S135). Then, the processing ends.

Upon receiving the notification of the deviation from the autonomous travel route, the reception unit 151 of the management device 1 stores the notification in the data storage unit 153. The notification of the deviation from the autonomous travel route includes, for example, information on the position at which the deviation occurs (in the present embodiment, the specific position on the autonomous travel route), information on a detection time of the deviation, and information indicating which condition is satisfied.

Figure 7:
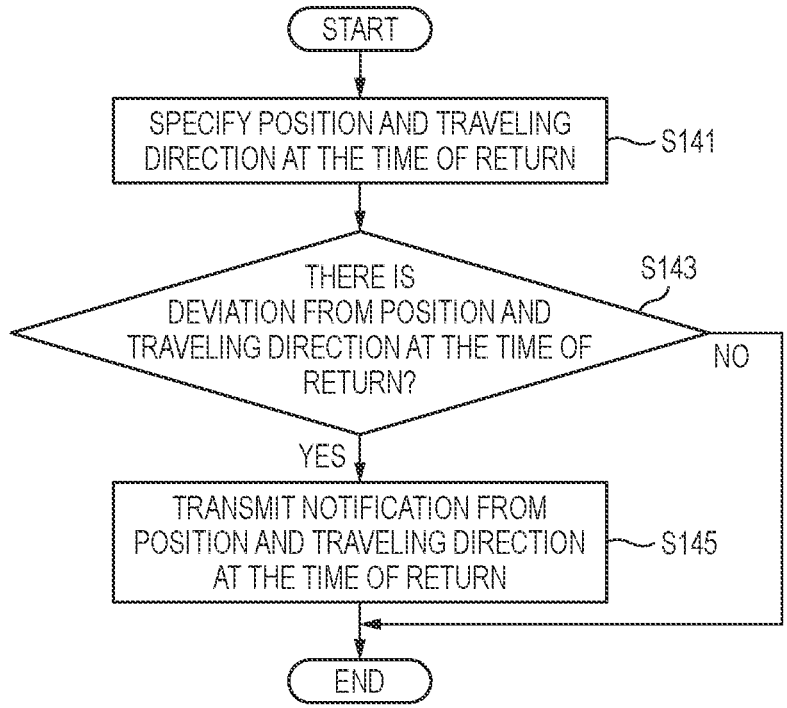
FIG. 7 shows a flow of processing executed by the autonomous mobile machine.

FIG. 7 shows a flow of processing executed by the autonomous mobile machine 2. The processing is executed at regular time intervals after a predetermined time (for example, 10 seconds) elapses after the occurrence of the deviation from the autonomous travel route is detected by the processing described with reference to FIG. 6.

Based on the data stored in the data storage unit 253, the transmission unit 252 of the autonomous mobile machine 2 specifies a return position on the autonomous travel route and a traveling direction of the autonomous mobile machine 2 at the return position (hereinafter referred to as the "position and traveling direction at the time of return") (step S141), and stores the return position and the traveling direction in the data storage unit 253.

The return position is specified, for example, based on information such as (1) the current position of the autonomous mobile machine 2 and the traveling direction at the current position, (2) a destination on the autonomous travel route or a position of a next route passing point, and (3) a constraint on a machine body of the autonomous mobile machine 2. The constraint on the machine body is, for example, a turning radius of the autonomous mobile machine 2. The traveling direction at the return position is specified from the information on the autonomous travel route and the return position stored in the data storage unit 253. The processing of step S141 may not be executed each time. For example, the processing may be executed when the position or the traveling direction is increased by a predetermined value or more from the previously specified value.

Figure 8:
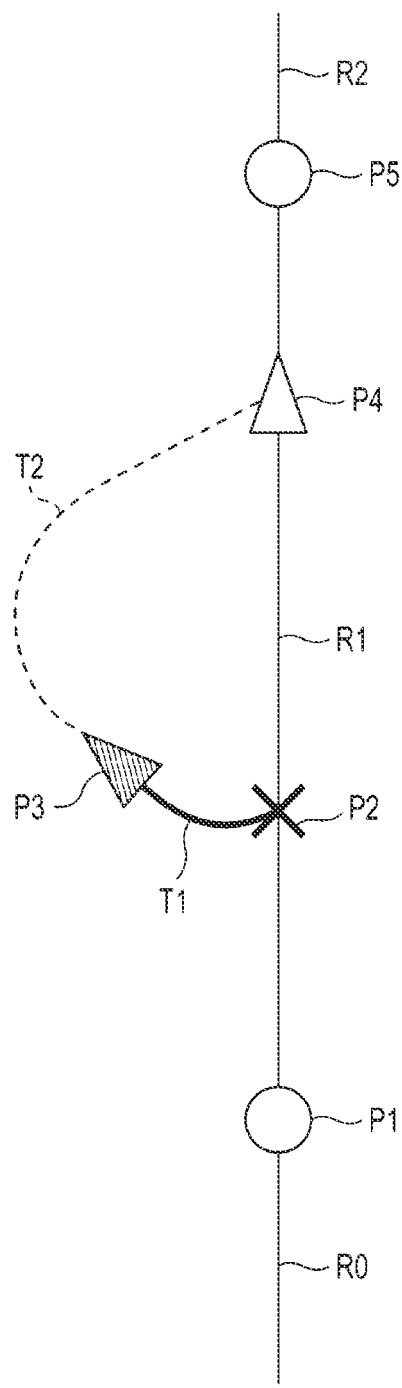
FIG. 8 is a first diagram for describing specification of a return position.

FIG. 8 is a first diagram for describing specification of the return position. In FIG. 8, P1 represents a first route passing point (first node) of the autonomous mobile machine 2, P2 represents a position at which a deviation from the autonomous travel route R1 occurs, P3 represents a current position of the autonomous mobile machine 2, P4 represents a return position, and P5 represents a second route passing point (second node) of the autonomous mobile machine 2.

The entire route of the autonomous mobile machine 2 includes a large number of route passing points (nodes), such as the first route passing point (first node), the second route passing point (second node), and the like, and route lines (edges) (travel routes such as R0, R1, R2, and the like) connecting the route passing points.

T1 represents a trajectory of the autonomous mobile machine 2 from P2 to P3, and T2 represents a return route which is a route from the current position of the autonomous mobile machine 2 to the return position. R1 represents an autonomous travel route until the autonomous mobile machine 2 reaches P5, and R2 represents an autonomous travel route after the autonomous mobile machine 2 has reached P5. A direction of an apex angle of each of isosceles triangles of P3 and P4 represents the traveling direction of the autonomous mobile machine 2.

Here, the return route T2 is set based on the current position of the autonomous mobile machine 2, the return position P4 set on the autonomous travel route before the next route passing point, and the turning radius of the autonomous mobile machine 2.

The return position P4 may be the same as the position P2 where the deviation occurs, but if the return position P4 is located between the position P2 where the deviation occurs and a second route passing point P5 on the autonomous travel route R1, it is possible to shorten the time until reaching the second route passing point P5. In addition, it may be easier to move to a position closer to the second route passing point P5 by manual driving than to return to the position P2 where the deviation occurs, considering the turning radius of the autonomous mobile machine 2, for example.

Figure 9:
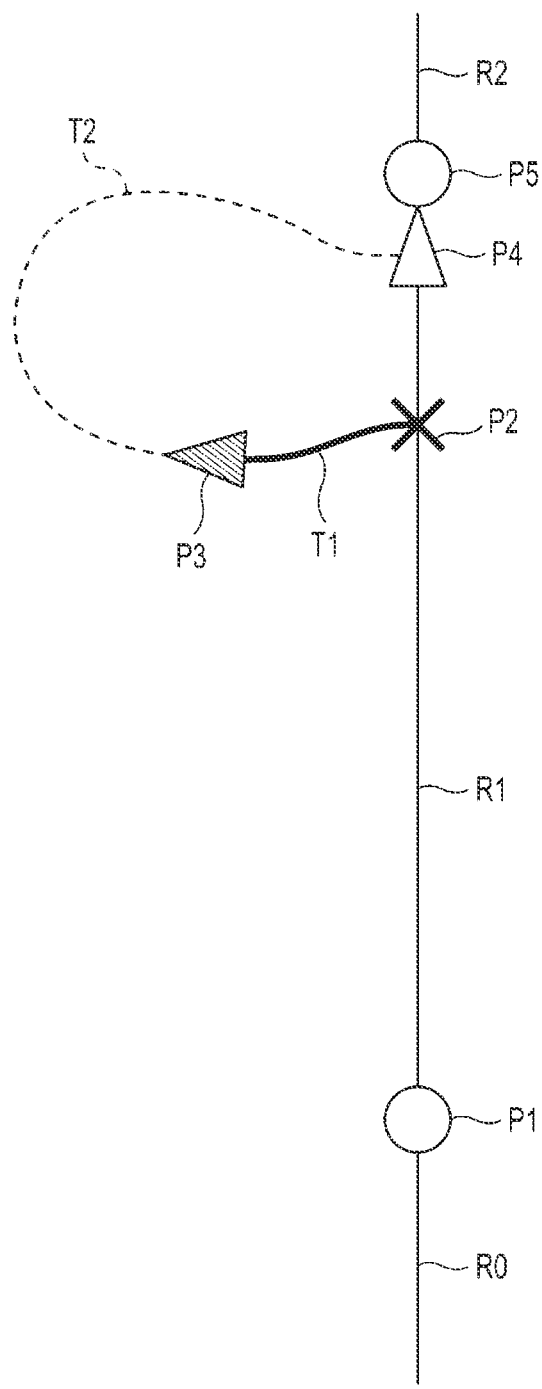
FIG. 9 is a second diagram for describing the specification of the return position.

FIG. 9 is a second diagram for describing the specification of the return position. In the example of FIG. 9, compared with the example of FIG. 8, the position P2 where the deviation occurs is close to the second route passing point P5. In such a case, when the return position P4 is set to a position ahead of the second route passing point P5 (that is, a position on R2), the autonomous mobile machine 2 must temporarily return to the second route passing point P5 after returning to the autonomous travel route R2. Therefore, even in the example shown in FIG. 9, the return position P4 is specified from the autonomous travel route R1.

Returning to the description of FIG. 7, the deviation detection unit 251 of the autonomous mobile machine 2 determines whether there is a deviation from the position and the traveling direction at the time of return based on the data stored in the data storage unit 253 (step S143). In step S143, it is determined whether the condition that the differential between the return position and the current position is equal to or greater than a predetermined value (for example, 3 meters) and the condition that the differential between the traveling direction of the autonomous mobile machine 2 at the return position and the traveling direction of the autonomous mobile machine 2 at the current position is equal to or greater than a predetermined value (for example, 5 degrees) are satisfied. In the present embodiment, when any one of the conditions is satisfied, it is determined that there is a deviation from the position and the traveling direction at the time of return.

If there is a deviation from the position and the traveling direction at the time of return (step S143: No route), the processing returns to step S143. If a deviation from the position and the traveling direction at the time of return occurs (step S143: Yes route), the deviation detection unit 251 of the autonomous mobile machine 2 generates a notification of the deviation from the position and the traveling direction at the time of return, and outputs the notification to the transmission unit 252. The transmission unit 252 transmits the notification of the deviation from the position and the traveling direction at the time of return to the management device 1 (step S145). Then, the processing ends.

Upon receiving the notification of the occurrence of the deviation from the position and the traveling direction at the time of return, the reception unit 151 of the management device 1 stores the notification in the data storage unit 153. The notification of the occurrence of the deviation from the position and the traveling direction at the time of returning includes, for example, the position and the traveling direction at the time of return, the information on a detection time of the deviation, and the information indicating which condition is satisfied.

Figure 10:
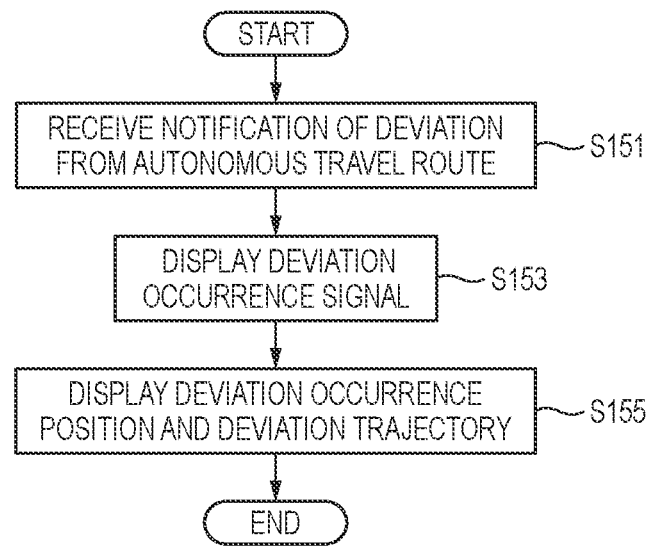
FIG. 10 shows a flow of processing executed by the management device.

FIG. 10 shows a flow of processing executed by the management device 1. The processing is executed when the notification of the deviation from the autonomous travel route is transmitted from the autonomous mobile machine 2 by the processing of FIG. 6.

The reception unit 151 of the management device 1 receives the notification of the deviation from the autonomous travel route from the autonomous mobile machine 2 (step S151), and stores the notification in the data storage unit 153.

The data processing unit 152 of the management device 1 generates display data on a deviation occurrence signal based on the data stored in the data storage unit 153, and displays the display data on the output device (for example, a display) of the management device 1 (step S153). The display data of the deviation occurrence signal is generated based on information indicating which condition is satisfied.

Based on the data stored in the data storage unit 153, the data processing unit 152 of the management device 1 generates display data on a deviation occurrence position and a deviation trajectory, and displays the display data on the output device of the management device 1 (step S155). The display data of the deviation trajectory is generated, for example, from data on a deviation detection time and data on a position between a position at the detection time and a deviation occurrence position.

Figure 11:
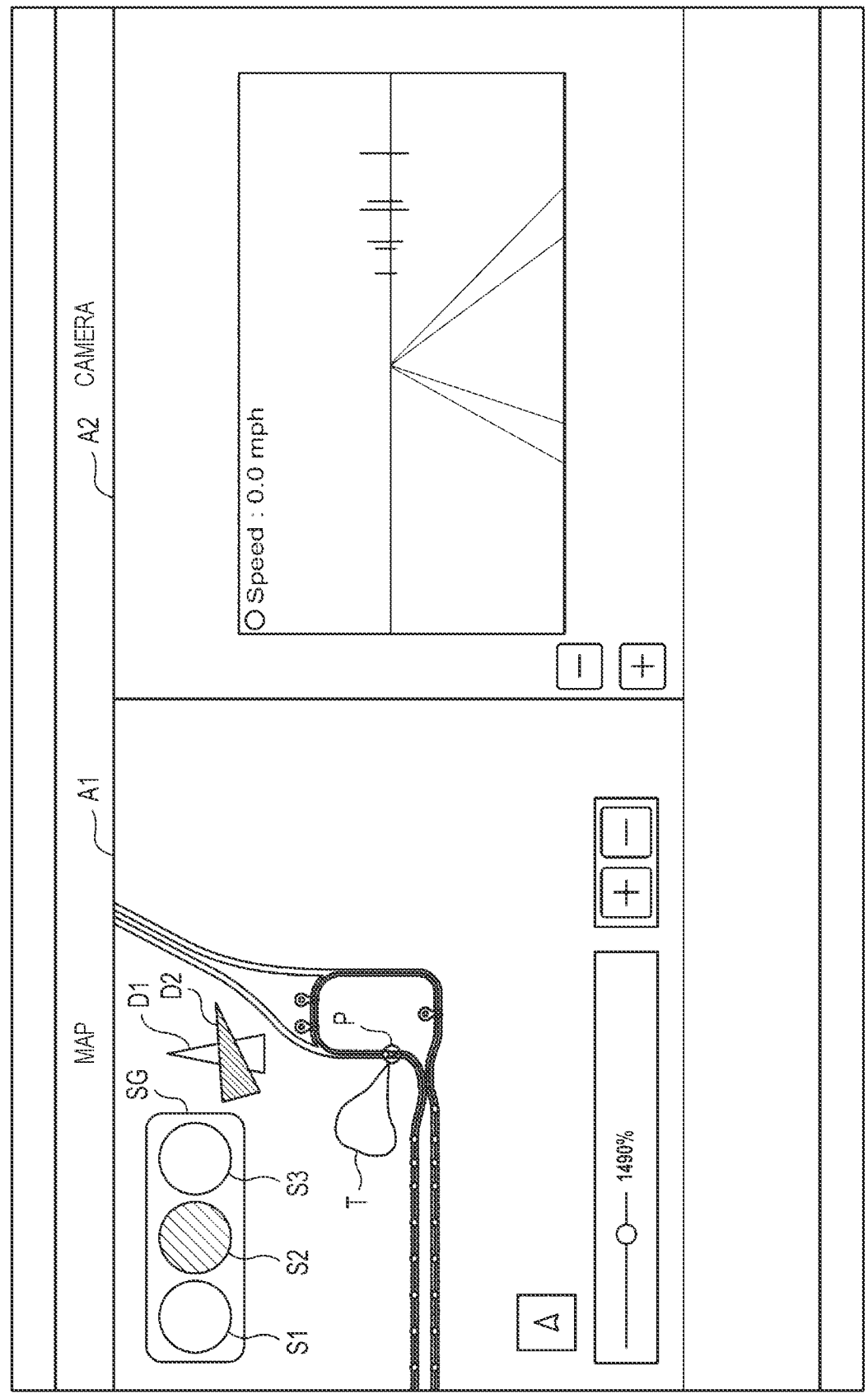
FIG. 11 shows an example of a screen displayed on an output device of the management device.

FIG. 11 shows an example of a screen displayed on the output device of the management device 1. In the example of FIG. 11, the screen includes a map display portion A1 on which a map of an area where the autonomous travel route of the autonomous mobile machine 2 is present is displayed, and an image display portion A2 on which an image captured by the camera of the autonomous mobile machine 2 is displayed.

A deviation occurrence signal SG is displayed on the map display portion A1. The deviation occurrence signal SG includes a first region S1, a second region S2, and a third region S3. The data processing unit 152 changes a mode of each region depending on which condition of the two conditions related to the occurrence of the deviation from the autonomous travel route is satisfied. For example, in a case where only the condition that the differential between the specific position on the autonomous travel route and the current position of the autonomous mobile machine 2 is equal to or greater than the predetermined value is satisfied, a mode of the first region S1 is made different from a mode of the second region S2 and a mode of the third region S3. In a case where only the condition that the differential between the traveling direction of the autonomous mobile machine 2 at the specific position on the autonomous travel route and the traveling direction of the autonomous mobile machine 2 at the current position is equal to or greater than the predetermined value is satisfied, the mode of the second region S2 is made different from the mode of the first region S1 and the mode of the third region S3. In a case where both conditions are satisfied, the mode of the third region S3 is made different from the mode of the first region S1 and the mode of the second region S2. Accordingly, a person who performs the manual driving can appropriately know a state of the autonomous mobile machine 2. In the example of FIG. 11, the mode of the second region S2 is different from the mode of the first region S1 and the mode of the third region S3.

A deviation occurrence position P and a deviation trajectory T are displayed on the map display portion A1. In the example of FIG. 11, the autonomous mobile machine 2 deviates from the autonomous travel route from the deviation occurrence position P and returns to the deviation occurrence position P. In the example, the return position is the deviation occurrence position P. In addition, the map display portion A1 shows a traveling direction D1 at the deviation occurrence position and a current traveling direction D2. A direction of an apex angle of an isosceles triangle represents the traveling direction. By performing a manual driving operation while confirming such a display, the autonomous mobile machine 2 can be appropriately returned to the autonomous travel route.

Figure 12:
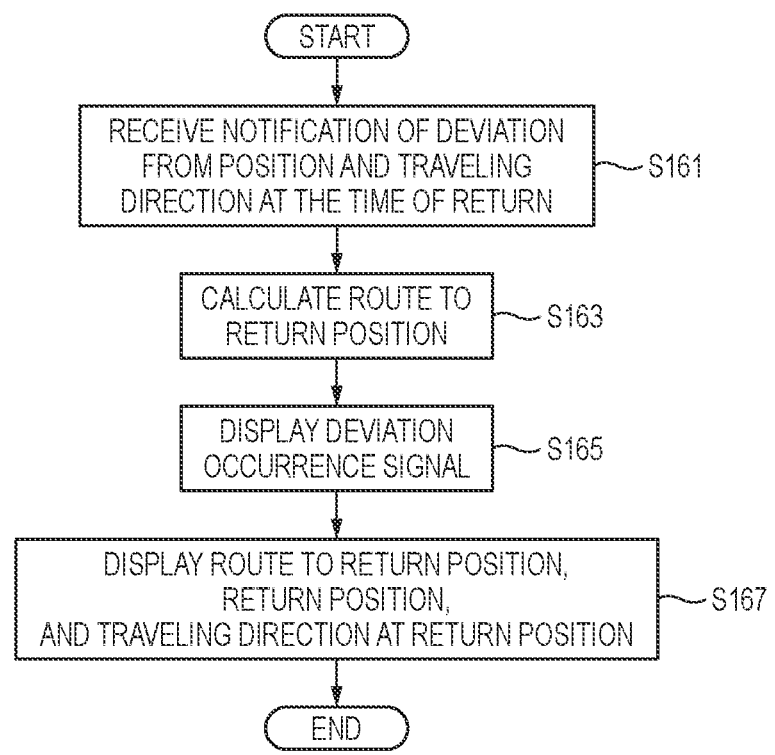
FIG. 12 shows a flow of processing executed by the management device.

FIG. 12 shows a flow of processing executed by the management device 1. The processing is executed when the notification of the deviation from the position and the traveling direction at the time of return is transmitted from the autonomous mobile machine 2 by the processing of FIG. 7.

The reception unit 151 of the management device 1 receives, from the autonomous mobile machine 2, a notification of a deviation from the position and the traveling direction at the time of return (step S161), and stores the notification in the data storage unit 153.

The reception unit 151 of the management device 1 specifies a route to the return position based on the data stored in the data storage unit 153 from the autonomous mobile machine 2 (step S163), and stores data of the specified route in the data storage unit 153. The route to the return position is specified based on the position and the traveling direction at the time of return, the position at the deviation detection time, the traveling direction at the position, the turning radius of the autonomous mobile machine 2, and the like.

The data processing unit 152 of the management device 1 generates display data on a deviation occurrence signal based on the data stored in the data storage unit 153, and displays the display data on the output device of the management device 1 (step S165). The display data of the deviation occurrence signal is generated based on information indicating which condition is satisfied. A display mode of the deviation occurrence signal displayed in step S165 is the same as the display mode of the deviation occurrence signal displayed in step S153.

The data processing unit 152 of the management device 1 generates display data on the route to the return position, the return position, and the traveling direction at the return position based on the data stored in the data storage unit 153, and displays the display data on the output device of the management device 1 (step S167). Then, the processing ends.

A return route to the return position is displayed on the screen in the mode of T2 in FIGS. 8 and 9, for example. The return route to the return position may be displayed so as to indicate the return route to the return position after the current position in the trajectory T of the manual driving in FIG. 11. The return position is displayed in the mode of P4 in FIGS. 8 and 9, for example. The display data in the traveling direction at the return position may be displayed in the mode of D1 in FIG. 11, or may be displayed in the mode of P4 in FIGS. 8 and 9.

Although various embodiments have been described above with reference to the drawings, the present invention is not limited thereto. It is apparent that those skilled in the art can conceive of various modifications and changes within the scope described in the claims, and it is understood that such modifications and changes naturally fall within the technical scope of the present invention. In addition, constituent elements in the embodiment described above may be freely combined without departing from the gist of the present invention.

In the example described above, the deviation is detected in the autonomous mobile machine 2, but the deviation may be detected in the management device 1 that receives the position information from the autonomous mobile machine 2. In the example described above, the return position is specified in the autonomous mobile machine 2, but the return position may be specified in the management device 1 and the information on the specified return position may be transmitted to the autonomous mobile machine 2. As described above, the side on which the processing of the present embodiment is executed can be appropriately changed without departing from the gist of the invention.

The display shown in FIG. 11 is an example. A screen in a mode in which the deviation occurrence signal SG is further increased may be displayed, and a person who performs manual driving may more easily recognize the deviation occurrence signal SG. A shape of the display of the deviation occurrence signal SG is not limited to the example shown in FIG. 11. Further, the deviation occurrence signal may not be a visual signal, and may be an auditory signal.

Note that the positioning method is not limited to the RTK-GNSS. It is also possible to use another relative positioning method.

In the present specification, at least the following matters are described. Although corresponding constituent elements or the like in the above-described embodiment are shown in parentheses, the present invention is not limited thereto.

(1) A driving assistance method including,
executing processes of, by one or more processors (11, 211),
acquiring at least one of a first position on an autonomous driving route and a first angle indicating a direction in which a mobile machine (2) travels at the first position when the mobile machine deviates from the autonomous driving route by switching from autonomous driving to manual driving (Steps S131, 141), and
outputting driving assistance information for assisting the manual driving according to at least one of a difference between the first position and a second position that is a position of the mobile machine traveling by the manual driving, and a difference between the first angle and a second angle indicating a direction in which the mobile machine is traveling at the second position (Steps S153, 155, 165, 167).

According to (1), it is possible to assist driving of a mobile machine capable of autonomous driving and manual driving. In particular, when the mobile machine deviates from the autonomous driving route by switching to the manual driving, the manual driving is assisted, and an influence on an operation plan of the mobile machine can be reduced.

(2) The driving assistance method according to (1), in which
the one or more processors generate notification information for a person who performs the manual driving when at least one of a first condition that the difference between the first position and the second position is equal to or greater than a first predetermined value and a second condition that the difference between the first angle and the second angle is equal to or greater than a second predetermined value is satisfied, and
the driving assistance information includes the generated notification information.

According to (2), the person who performs the manual driving can notice that the position and the angle of the mobile machine are not appropriate. In particular, in the case of remote manual driving, it is not easy to notice that the position and angle of the mobile machine are not appropriate, and thus an effect of the driving assistance information is larger.

(3) The driving assistance method according to (1), in which
notification information when the first condition is satisfied and the second condition is not satisfied, notification information when the first condition is not satisfied and the second condition is satisfied, and notification information when the first condition is satisfied and the second condition is satisfied are different.

According to (3), the person who performs the manual driving can more accurately know whether the position and the angle of the mobile machine are appropriate.

(4) The driving assistance method according to (1), in which
the one or more processors further execute a process of generating information on a return route from the second position to the first position, and
the driving assistance information includes the generated information on the return route.

According to (4), it is possible to promote the restart of the autonomous driving. The person who performs the manual driving can easily return the mobile machine to the autonomous driving route by checking the return route.

(5) The driving assistance method according to (1), in which
the one or more processors further execute a process of calculating the first position based on the second position and the second angle, and a next route passing point or a position of a destination on the autonomous driving route.

The position to which the mobile machine should return may be various positions depending on the situation. According to (5), the mobile machine can be returned to an appropriate position according to a positional relationship with the next route passing point or the destination.

(6) The driving assistance method according to (5), in which
the one or more processors calculate the first position based on a constraint on a machine body of the mobile machine.

Depending on the constraint on the machine body of the mobile machine, for example, there is a case where the mobile machine cannot return by the calculated return route. According to (6), the mobile machine can be returned to an appropriate position in accordance with the constraint on the machine body of the mobile machine.

(7) The driving assistance method according to (1), in which
the driving assistance information includes the first position and the first angle.

The person who performs the manual driving can more easily return the mobile machine to an appropriate position on the autonomous driving route.

(8) The driving assistance method according to (1), in which
the first position is a position between a position at which the mobile machine deviates from the autonomous driving route and a next route passing point or a destination on the autonomous driving route.

If the mobile machine can reach the next route passing point or the destination, there is a case where the mobile machine may not move from the beginning to the end on the autonomous driving route. According to (8), the mobile machine can be returned to an appropriate position in relation to the next route passing point or the destination.

(9) The driving assistance method according to (1), in which
the first position is a position at which the mobile machine deviates from the autonomous driving route.

According to (9), the mobile machine can be returned to the position deviated from the autonomous driving route.

(10) A processing apparatus (management device 1, processor 11, mobile machine 2, processor 211) including:
a first processing unit configured to acquire at least one of a first position on an autonomous driving route and a first angle indicating a direction in which a mobile machine travels at the first position when the mobile machine deviates from the autonomous driving route by switching from autonomous driving to manual driving, and
a second processing unit configured to output driving assistance information for assisting the manual driving according to at least one of a difference between the first position and a second position that is a position of the mobile machine traveling by the manual driving, and a difference between the first angle and a second angle indicating a direction in which the mobile machine is traveling at the second position.

According to (10), it is possible to assist driving of a mobile machine capable of autonomous driving and manual driving. In particular, when the mobile machine deviates from the autonomous driving route by switching to the manual driving, the manual driving is assisted, and it is possible to prevent the occurrence of troubles in work or the like of the mobile machine.

(11) A mobile machine (2) including:
the processing apparatus according to (10).

According to (11), the processing can be executed in the mobile machine itself.

(12) A driving assistance method for assisting driving of a mobile machine, the driving assistance method comprising:
executing processes of, by one or more processors (11, 211),
acquiring a return position on an autonomous driving route when the mobile machine deviates from the autonomous driving route by switching from autonomous driving to manual driving (step S141), and
generating information on a return route from a second position that is a position of the mobile machine traveling by the manual driving to the return position according to the return position and the second position (step S167).

According to (12), it is possible to assist driving of a mobile machine capable of autonomous driving and manual driving. In particular, when the mobile machine deviates from the autonomous driving route by switching to the manual driving, the mobile machine easily returns to the autonomous driving route.

(13) The driving assistance method according to (12), in which
the return position is a position between a position at which the mobile machine deviates from the autonomous driving route and a next route passing point or a destination on the autonomous driving route.

If the mobile machine can reach the next route passing point or the destination, there is a case where the mobile machine may not move from the beginning to the end on the autonomous driving route. According to (13), the mobile machine can be returned to an appropriate position in relation to the next route passing point or the destination.

(14) The driving assistance method according to (12), in which
the return position is a position at which the mobile machine deviates from the autonomous driving route.

What is claimed is:

1. A driving assistance method for assisting driving of a mobile machine, the driving assistance method comprising:
executing processes of, by one or more processors,
acquiring at least one of a first position on an autonomous driving route and a first angle indicating a direction in which the mobile machine travels at the first position when the mobile machine deviates from the autonomous driving route by switching from autonomous driving to manual driving,
outputting driving assistance information for assisting the manual driving according to at least one of a difference between the first position and a second position that is a position of the mobile machine traveling by the manual driving, and a difference between the first angle and a second angle indicating a direction in which the mobile machine is traveling at the second position, and
calculating the first position based on the second position and the second angle, and a next route passing point or a position of a destination on the autonomous driving route.

2. The driving assistance method according to claim 1, wherein
the one or more processors generate notification information for a person who performs the manual driving when at least one of a first condition that the difference between the first position and the second position is equal to or greater than a first predetermined value and a second condition that the difference between the first angle and the second angle is equal to or greater than a second predetermined value is satisfied, and
the driving assistance information includes the generated notification information.

3. The driving assistance method according to claim 2, wherein
notification information when the first condition is satisfied and the second condition is not satisfied, notification information when the first condition is not satisfied and the second condition is satisfied, and notification information when the first condition is satisfied and the second condition is satisfied are different.

4. The driving assistance method according to claim 1, wherein
the one or more processors further execute a process of generating information on a return route from the second position to the first position, and
the driving assistance information includes the generated information on the return route.

5. The driving assistance method according to claim 1, wherein
the one or more processors calculate the first position based on a constraint on a machine body of the mobile machine.

6. The driving assistance method according to claim 1, wherein
the driving assistance information includes the first position and the first angle.

7. The driving assistance method according to claim 1, wherein
the first position is a position between a position at which the mobile machine deviates from the autonomous driving route and a next route passing point or a destination on the autonomous driving route.

8. The driving assistance method according to claim 1, wherein
the first position is a position at which the mobile machine deviates from the autonomous driving route.

9. A processing apparatus comprising circuitry configured to:
acquire at least one of a first position on an autonomous driving route and a first angle indicating a direction in which a mobile machine travels at the first position when the mobile machine deviates from the autonomous driving route by switching from autonomous driving to manual driving;
output driving assistance information for assisting the manual driving according to at least one of a difference between the first position and a second position that is a position of the mobile machine traveling by the manual driving, and a difference between the first angle and a second angle indicating a direction in which the mobile machine is traveling at the second position; and
calculate the first position based on the second position and the second angle, and a next route passing point or a position of a destination on the autonomous driving route.

10. A mobile machine comprising:
the processing apparatus according to claim 9.

11. A driving assistance method for assisting driving of a mobile machine, the driving assistance method comprising:
executing processes of, by one or more processors,
acquiring a return position on an autonomous driving route when the mobile machine deviates from the autonomous driving route by switching from autonomous driving to manual driving, and
generating information on a return route from a second position that is a position of the mobile machine traveling by the manual driving to the return position according to the return position and the second position,
wherein the return position is specified based on the second position, a direction in which the mobile machine is traveling at the second position, and a next route passing point or a position of a destination on the autonomous driving route.

12. The driving assistance method according to claim 11, wherein
the return position is a position between a position at which the mobile machine deviates from the autonomous driving route and the next route passing point or the destination on the autonomous driving route.

13. The driving assistance method according to claim 11, wherein
the return position is a position at which the mobile machine deviates from the autonomous driving route.

* * * * *